United States Patent [19]

Svensson et al.

[11] 4,355,548

[45] Oct. 26, 1982

[54] TOOL TURRET

[75] Inventors: Rolf Svensson; Ingemar Svensson, both of Västerås, Sweden

[73] Assignee: SMT Machine Company AB, Sweden

[21] Appl. No.: 179,394

[22] Filed: Aug. 19, 1980

[51] Int. Cl.³ ............................................. B23Q 17/00
[52] U.S. Cl. ................................... 74/826; 74/813 C
[58] Field of Search .................... 74/826, 813 C, 817, 74/822

[56] References Cited

U.S. PATENT DOCUMENTS

| | | | |
|---|---|---|---|
| 3,545,317 | 12/1970 | Shultz et al. | 74/826 |
| 3,552,242 | 1/1971 | Morgan et al. | 74/826 |
| 3,593,597 | 7/1971 | Jennings | 74/826 |
| 3,889,555 | 6/1975 | Frank et al. | 74/826 |
| 3,999,264 | 12/1976 | Carmen | 74/826 |
| 4,080,849 | 3/1978 | Benjamin et al. | 74/826 |
| 4,151,759 | 5/1979 | Buchmeier | 74/826 |
| 4,189,963 | 2/1980 | Sano et al. | 74/817 |

Primary Examiner—Kenneth Dorner
Assistant Examiner—Charles M. Wall
Attorney, Agent, or Firm—Townsend and Townsend

[57] ABSTRACT

A tool turret according to the invention comprises a turret head which is shiftable between a rotational position and a working position, drive means adapted to rotate the turret head in the rotational position and being in permanent engagement with the turret head, fixation means for locking the turret head in the working position, and a transducer sensing the position of the turret head.

The turret head is rotatable with respect to a non-rotary body which is axially displaceable with the turret head and which has a circumferential projection serving as a piston and being mounted axially displaceable in an annular recess serving as a cylinder and formed in a seat, receiving the body, of a member supporting the body. The projection and the annular recess cooperate with each other to ensure axial displacement of the body with the turret head between the rotational position and the working position.

The transducer is fixedly connected to and axially displaceable with the body and is adapted to sense the relative angular position between the body and the turret head.

5 Claims, 1 Drawing Figure

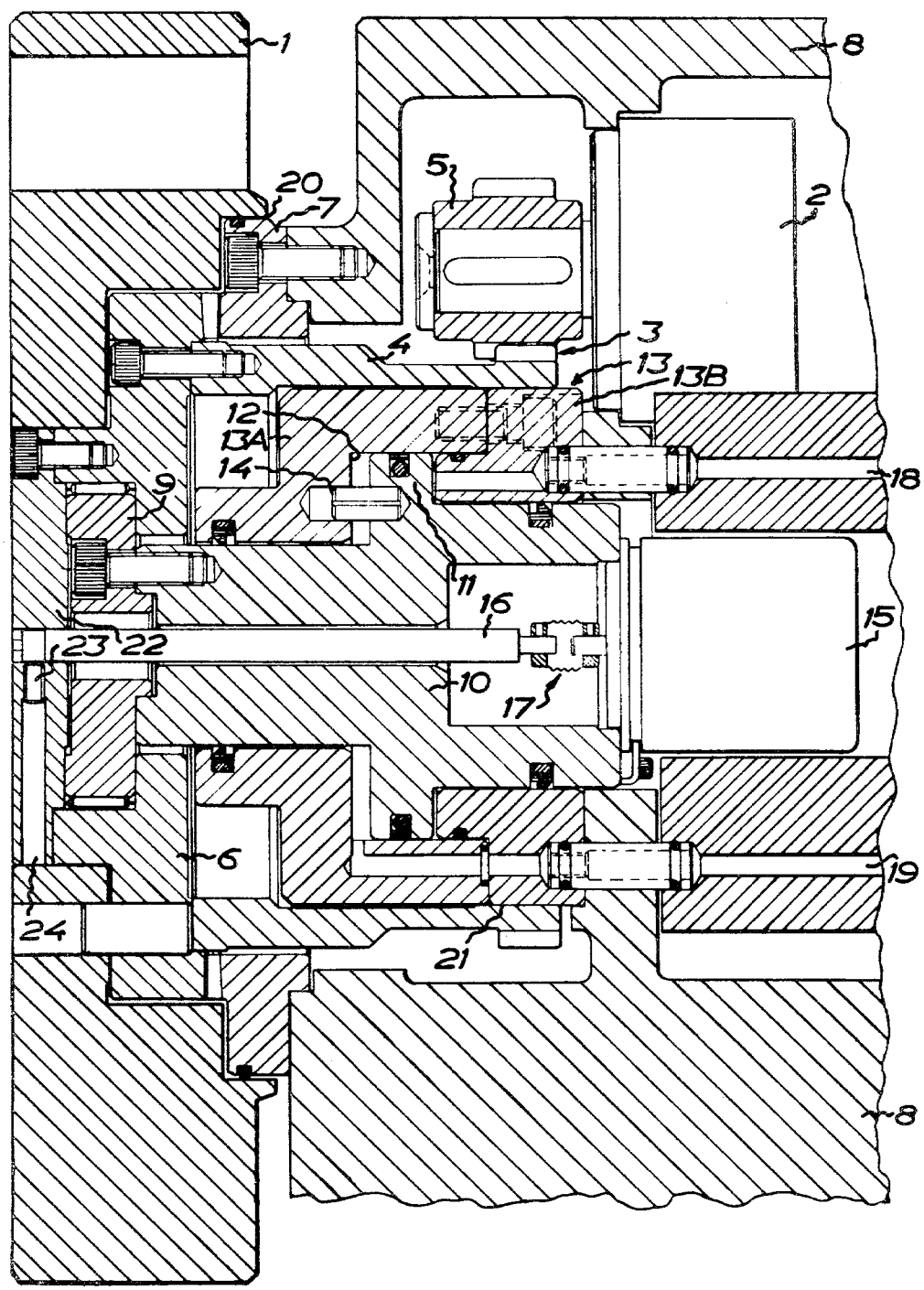

TOOL TURRET

The present invention relates to a tool turret comprising a turret head which is shiftable between a rotational position and a working position, drive means adapted to rotate said turret head in said rotational position and being in permanent engagement with the turret head, fixation means locking the turret head in said working position, and a transducer sensing the position of the turret head which is rotatable with respect to a nonrotary body axially displaceable with the turret head and having a circumferential projection which serves as a piston and is received and axially displaceable in an annular recess serving as a cylinder and being formed in a seat, receiving said body, of a member supporting said body, said projection and said annular recess cooperating with each other to provide axial displacement of said body with the turret head between said rotational position and said working position.

In prior art lathes, the tool carrier often consists of a turret whose rotary head carries the tools along its periphery. In order to displace a tool from a rest position to a working position where the tool can be brought into contact with the workpiece, the turret head must thus be rotated through a certain angle. This rotation should, of course, be effected as rapidly as possible since the time consumed by this operation is unproductive. For this reason, it is desirable to be able to choose the direction of rotation so as to have the shortest way to the working position. Accurate positional determination is often performed by means of so-called end-tooth gear rings one half of which is mounted on the rotary head and the other of which is mounted on the stationary housing. In the locking position, the two ring halves are pressed against each other and, during rotation, are removed from each other.

In order to find the correct gear mesh for the end-tooth gear rings, the rapid indexing movement must be slowed down with a certain allowance.

The object of the present invention is to provide a tool turret by means of which the changing of tools is performed more rapidly than in conventional tool turrets and which is simple and reliable as to its construction and operation.

According to the invention, this object is achieved in that the transducer which is fixedly connected to and axially displaceable with said body is a pulse transducer adapted to sense the relative angular position between said body and said turret head.

Preferred embodiments of the present invention have been given the features defined in the appended subclaims.

With this tool turret the selection of the indexing position and the angle of the slow-down distance can be made in a very simple way and independently of the direction of rotation.

The invention will be described in greater detail hereinbelow with reference to the accompanying drawing showing a preferred embodiment of a tool turret according to the invention as seen in cross-section.

In the drawing, an indexible turret head 1 is driven by a hydraulic motor 2 via a gear ring 3 which consists of a gear rim 4 connected to the turret head by means of, for instance, a bolt assembly, and a pinion 5 connected to the hydraulic motor 2. The turret head 1 is axially shiftable between a rotational position and a working position in which the turret head is locked by end-tooth gear rings 6 and 7, of which the gear ring 6 is connected to the turret head 1 by means of, for instance, a bolt assembly and the gear ring 7 is connected by means of, for instance, a bolt assembly to a stationary housing 8 of a preferably numerically controlled machine tool, such as a lathe or a milling cutter. The turret head is rotatably carried by an annular disc 9, for instance by means of roller bearings. The disc 9 is fixed, for instance by means of a bolt assembly, to a body 10 which has a circumferential projection 11 serving as a piston and being received and axially displaceable in an annular recess 12 which serves as a cylinder and is formed in a seat, receiving the body 10, of a member 13 supporting the body 10. The member supporting the body is fixedly connected to the stationary housing 8 and consists of two interconnected portions 13A and 13B. A device 14 preventing rotational movement of the body 10 is disposed in at least one pair of substantially horizontal registering holes in the body 10 and the member 13 supporting the body. Thus, this device 14 will prevent the body 10 from rotating with respect to the stationary housing 8 but will however not prevent axial displacement of the body 10 with respect to the stationary housing 8.

A transducer 15, such as a pulse transducer or any suitable angle sensing means, e.g. a resolver, sensing the position of the turret head is fixedly connected to the body 10 at the end thereof which is remote from the turret head 1. The turret head 1 has a central shaft 16 which is rotatably mounted in a bore through the body 10, the distal end of the shaft 16 with respect to the turret head communicating with the transducer 15 at 17 in order to sense the relative angular position between the stationary housing 8 and the turret head 1.

In order to shift the turret head between the rotational position and the working position, a hydraulic pressure fluid, such as hydraulic oil, is fed into a channel 18 or a channel 19 with a view to displacing the projection 11 serving as a piston axially to the left and to the right in the drawing, respectively, in the recess 12 serving as a cylinder. Consequently, the end-tooth gear rings 6 and 7 will be moved axially out of mesh with each other when the pressure fluid is fed into the channel 18 and in mesh with each other when the pressure fluid is fed into the channel 19.

For attaining satisfactory stability of the turret head, it is supported not only by the body 10 but also by axial surfaces 20 and 21 serving as slide bearings and provided on the turret head 1 and on the inner side of the gear rim 4, respectively.

In operation, the transducer emits a suitable number of pulses per revolution, each of which represents an angular sector. When the turret head 1 approaches the desired position, which for instance has been programmed in the case of a numerically controlled machine tool, the speed of rotation of the turret head is reduced at a suitable distance from the end position in that the flow to the hydraulic motor is throttled and completely interrupted when the teeth and tooth gaps of the end-tooth gear rings are in the correct position. The turret head can now be locked mechanically to the housing by means of the end-tooth gear rings 6 and 7 and by the hydraulic action of the piston and cylinder assembly consisting of the projection 11 and the recess 12. An annular plate 22 fixed to the gear ring 6, for instance by means of a bolt assembly, is disposed at the front of the turret head, the central shaft 16 being adjustably mounted in a central hole in the plate 22. By removing the turret head, it is possible to unscrew a threaded pin 23 mounted in a radial hole 24 in the plate 22, by means of a screw-driver, whereupon the central shaft can be turned by means of a screw-driver from the front of the plate.

As is evident from the drawing, a number of O-ring gaskets are disposed in circumferential grooves on the tool turret to prevent leakage of oil and also to prevent impurities from entering into the turret.

The invention is, of course, not restricted to the embodiment described above and shown in the drawing but may be modified within the spirit and scope of the accompanying claims.

We claim:

1. A tool turret comprising a turret head (1) which is displaceable between a rotational position and a working position, drive means (4, 5) adapted to rotate said turret head in said rotational position and being in constant engagement with the turret head, fixation means (6, 7) locking the turret head in said working position, and a transducer (15) sensing the position of the turret head which is rotatable with respect to a non-rotary body (10) axially displaceable with the turret head and having a circumferential projection (11) which serves as a piston and is received and axially displaceable in an annular recess (12) serving as a cylinder and being formed in a seat, receiving said body, of a member (13) supporting said body, said projection and said annular recess cooperating with each other to provide axial shifting of said body with the turret head between said rotational position and said working position, characterized in that said transducer (15) which is fixedly connected and axially displaceable with said body (10) is a pulse transducer adapted to sense the relative angular position between said body and said turret head.

2. Turret as claimed in claim 1, characterized in that the turret head (1) has a central shaft (16) which extends through the body (10) and, at its end remote from the turret head, is connected to said transducer (15) which is secured to the end of the body that is remote from the turret head.

3. Turret as claimed in claim 1 or 2, characterized in that said fixation means comprises two end-tooth gearings (6, 7) which are disposed on the turret head (1) and on the member (13) supporting said body (10), respectively.

4. Turret as claimed in any one of claims 1 or 2, characterized in that said drive means comprises a gear rim (4) and a pinion (5), said gear rim being connected to the turret head (1) and said pinion being connected to the members (13) supporting said body 10.

5. Turret as claimed in any one of claims 1 or 2, characterized in that said projection (11) and said recess (12) form a double-acting hydraulic piston and cylinder assembly.

* * * * *